United States Patent
Abhiram

(10) Patent No.: US 11,429,820 B2
(45) Date of Patent: Aug. 30, 2022

(54) METHODS FOR INTER-CAMERA RECOGNITION OF INDIVIDUALS AND THEIR PROPERTIES

(71) Applicant: Recogni Inc., Cupertino, CA (US)

(72) Inventor: Shabarivas Abhiram, Mountain View, CA (US)

(73) Assignee: Recogni Inc., San Jose, CA (US)

( * ) Notice: Subject to any disclaimer, the term of this patent is extended or adjusted under 35 U.S.C. 154(b) by 845 days.

(21) Appl. No.: 16/273,609

(22) Filed: Feb. 12, 2019

(65) Prior Publication Data
US 2019/0286947 A1 Sep. 19, 2019

Related U.S. Application Data

(60) Provisional application No. 62/642,578, filed on Mar. 13, 2018, provisional application No. 62/689,989, filed on Jun. 26, 2018.

(51) Int. Cl.
| | |
|---|---|
| *G06K 9/62* | (2022.01) |
| *G06N 5/04* | (2006.01) |
| *G06N 3/08* | (2006.01) |
| *G06V 20/10* | (2022.01) |
| *G06V 40/16* | (2022.01) |

(52) U.S. Cl.
CPC ............ *G06K 9/6269* (2013.01); *G06N 3/08* (2013.01); *G06N 5/046* (2013.01); *G06V 20/10* (2022.01); *G06V 40/161* (2022.01); *G06V 40/172* (2022.01)

(58) Field of Classification Search
CPC ............ G06K 9/6269; G06K 9/00664; G06K 9/00228; G06K 9/00288; G06N 3/08; G06N 5/046; G06V 20/10; G06V 40/161; G06V 40/172; G06V 10/82
See application file for complete search history.

(56) References Cited

U.S. PATENT DOCUMENTS

2019/0121877 A1* 4/2019 Vyas ............... G06V 10/955

FOREIGN PATENT DOCUMENTS

| CN | 104834748 A | * | 8/2015 | ....... G06F 17/30244 |
|---|---|---|---|---|
| CN | 105512273 A | * | 4/2016 | ............. G06F 16/58 |
| CN | 106407352 A | * | 2/2017 | ........... G06F 16/783 |
| CN | 104346440 B | * | 6/2017 | |
| CN | 107885764 A | * | 4/2018 | ............. G06F 16/36 |
| CN | 108171136 A | * | 6/2018 | ......... G06K 9/00825 |

OTHER PUBLICATIONS

International Preliminary Report on Patentability dated Sep. 24, 2020, from The International Bureau of WIPO, for International Patent Application No. PCT/US2019/017786 (filed Feb. 13, 2019), 8 pages.
International Search Report and Written Opinion dated May 27, 2019, from the ISA/European Patent Office, for International Application No. PCT/US2019/017786 (filed Feb. 13, 2019), 14 pages.

(Continued)

*Primary Examiner* — Carol Wang
(74) *Attorney, Agent, or Firm* — Ascenda Law Group, PC

(57) ABSTRACT

A convolutional neural network is used to generate hash strings corresponding to object instances. The characteristic hash strings are used to recognize the same object instance depicted in images generated at different times and by different camera devices.

7 Claims, 5 Drawing Sheets

(56) References Cited

OTHER PUBLICATIONS

Ranjan; et al., "An All-In-One Convolutional Neural Network for Face Analysis", Cornell University (Nov. 3, 2016), arXiv:1611.00851v1 [cs.CV], 9 pages.
Xiao; et al., "Joint Detection and Identification Feature Learning for Person Search", IEEE Computer Society Conference on Computer Vision and Pattern Recognition (Jul. 21, 2017), pp. 3376-3385.
Zhao; et al., "Learning Saliency Features for Face Detection and Recognition Using Multi-task Network", International Journal of Social Robotics (Mar. 22, 2016), 8:709-720.

* cited by examiner

METHODS FOR INTER-CAMERA RECOGNITION OF INDIVIDUALS AND THEIR PROPERTIES

RELATED APPLICATIONS

This is a NONPROVISIONAL of, claims priority to, and incorporates by reference U.S. Provisional Application No. 62/642,578, filed 13 Mar. 2018, and U.S. Provisional Application No. 62/689,989, filed 26 Jun. 2018.

FIELD OF THE INVENTION

The present invention is directed to approaches for recognizing individuals and their properties using neural network image analysis.

BACKGROUND

Conventional convolutional neural networks that are used for classification purposes take an image as input and may generate a one-dimensional vector containing the probabilities for various classes as an output. This sort of traditional classification can be useful to classify different types of objects (e.g., dog, cat, backpack, airplane), or even sub-types of a type of object (e.g., subtypes or breeds of dogs such as German shepherd, Australian cattle dog, rough collie). However, conventional neural network classification does not adapt well to recognizing individuals, rather than members of classes. For example, after training a convolutional neural network to distinguish between N types of some object X, then even if the training used good training data for all N types of object X, the network will inaccurately classify the (N+1)th type of object X. To combat this, N can be expanded to a very large number, but as N increases, the network becomes more difficult to train. As a reference, today's convolutional neural networks typically have between 50 and a few thousand classes/types that they can classify.

Accordingly, there is a need for systems and approaches that provide technical solutions to the problem of recognizing individuals rather than classes, and the present application discloses embodiments that address aspects of this need.

SUMMARY

Embodiments are described for, e.g., using a convolutional neural network to generate hash strings for identifying object instances. In certain embodiments, a system may receive a first training bundle comprising one or more first training images, a true class category vector for an object instance depicted in the one or more first training images, and a first true object instance identifier for the object instance depicted in the one or more first training images. The system may receive a set of second hash strings, each second hash string associated with a second true object instance identifier, where the set of second hash strings was generated by the convolutional neural network. The convolutional neural network may be trained to emit an object classification vector and an object instance hash string for the one or more first training images by the use of a hash-augmented loss function, wherein the hash-augmented loss function comprises a classifier loss term and a hash loss term, such that the classifier loss term penalizes the amount of distance between the object classification vector and the true class category vector, and the hash loss term penalizes similarity between the object instance hash string and any of the set of second hash strings where the first true object instance identifier does not match the second true object instance identifier, and the hash term penalizes distance between the object hash string and any of the set of second hash strings where the first true object instance identifier matches the second true object instance identifier. The system may receive one or more current images depicting a current object instance and determine the object classification vector for the current object instance and the object hash string for the current object instance by a forward pass through the convolutional neural network operating on the one or more current images. If the object hash string is known, the system may obtain object instance properties for the current object instance from a data store using the object hash string, and otherwise, provide a classification based on the object classification vector to the data store.

DETAILED DESCRIPTION

Embodiments of apparatuses, computer systems, computer-readable media, and methods for deploying systems for inter-camera recognition of individuals and their properties are described. Modern convolutional neural networks may be used to generate identifying hash strings based on various components that are desirable to track. The amalgamation of these hash strings may be used to form a master hash that is useful for identifying desirable traits and properties of object instances depicted in images and video. If camera devices are mounted so that each camera device has a different view of a monitoring area, identifying hash strings corresponding to object instances may be generated so that the same object instance results in the same identifying hash irrespective of the viewpoint of the camera, as discussed below.

Figure 1:
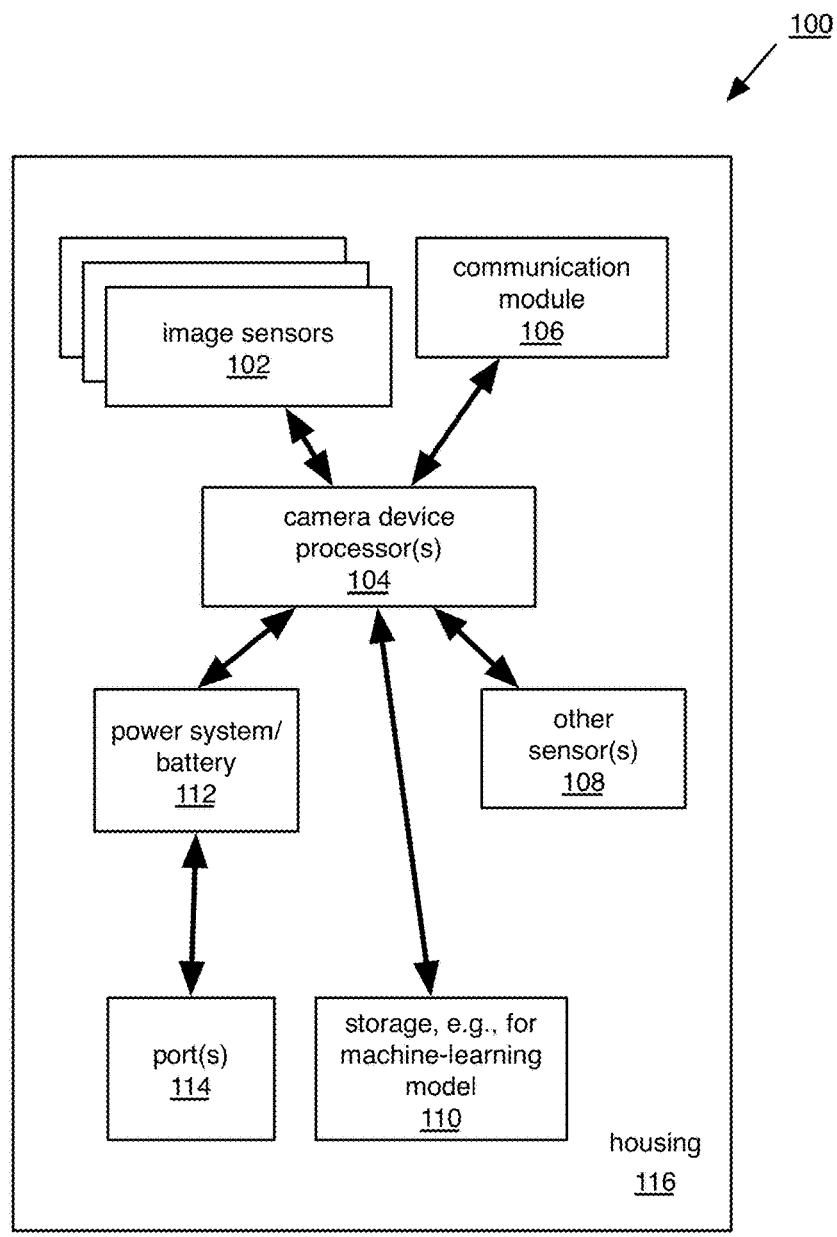
FIG. 1 depicts exemplary components of an image-generating camera device, in accordance with some embodiments of the invention.

FIG. 1 depicts exemplary components of an image-generating camera device 100. Camera device 100 includes one or more image sensors 102 for imaging the environment of device 100. For example, the image sensors 102 may be arranged in the device 100 with a certain spacing between respective sensors in order to enable inference of the depth of objects from device 100 in the environment of device 100. In certain embodiments, corresponding information from image sensors 102 positioned across multiple physical devices may be collected, for example in order to facilitate depth inference. Image sensors 102 may detect grayscale (single channel) light information, color (e.g., RGB, HSV/HSB, HSL, or YUV, to generate three or more color channels), or infrared light information. Image sensors 102 may be capable of providing 4K resolution images (i.e., generating images having at least 4,000 pixels along one dimension), or 10K resolution, or greater. In certain embodiments, camera device 300 may be mounted at a fixed position at a fixed height above the ground. The optical characteristics associated with an image sensor 102 may include, for example, the sensor's resolution, color detection profile, the sensor's position relative to the other sensors of the camera device, lens properties such as a wide-angle lens versus a regular lens, type of light information (infrared, visible, etc.), focal length, aperture, and the like.

In certain embodiments, camera device 100 may be mounted on a moving object, such as a person, a vehicle, or a drone; in certain embodiments, camera device 100 is fixed in position at a particular height and x,y location in a monitoring area.

Camera device 100 may include one or more camera device processors 104. In certain embodiments, any of processors 104 may be a special-purpose processor for computing neural network inference calculations, such as a convolver processor. In certain embodiments, processor 104 is a general-purpose processor. Processor 104 may be in communication with image sensors 102, a communication module 106, other sensors 108, a storage component 110, and a power system and/or battery 112. The power system/battery 112 may be in communication with one or more port(s) 114.

Camera device 100 may include one or more other sensors 108, such as a temperature sensor for monitoring thermal load or ambient temperature, an accelerometer, microphone, or the like. Communication module 106 may include a cellular radio, Bluetooth radio, ZigBee radio, Near Field Communication (NFC) radio, wireless local area network (WLAN) radio, a subscriber identity module (SIM) card, GPS receiver, and antennas used by each for communicating data over various networks such as a telecommunications network or wireless local area network. Storage 110 may include one or more types of computer readable medium, such as RAM, optical storage devices, or flash memory, and may store an operating system, applications, communication procedures, and a machine-learning model for inference based on the data generated by image sensors 102 (e.g., a local machine-learning model). The power system/battery 112 may include a power management system, one or more power sources such as a battery and recharging system, AC, DC, a power status indicator, and the like. In certain embodiments, the components of camera device 100 may be enclosed in a single housing 116.

Figure 2:
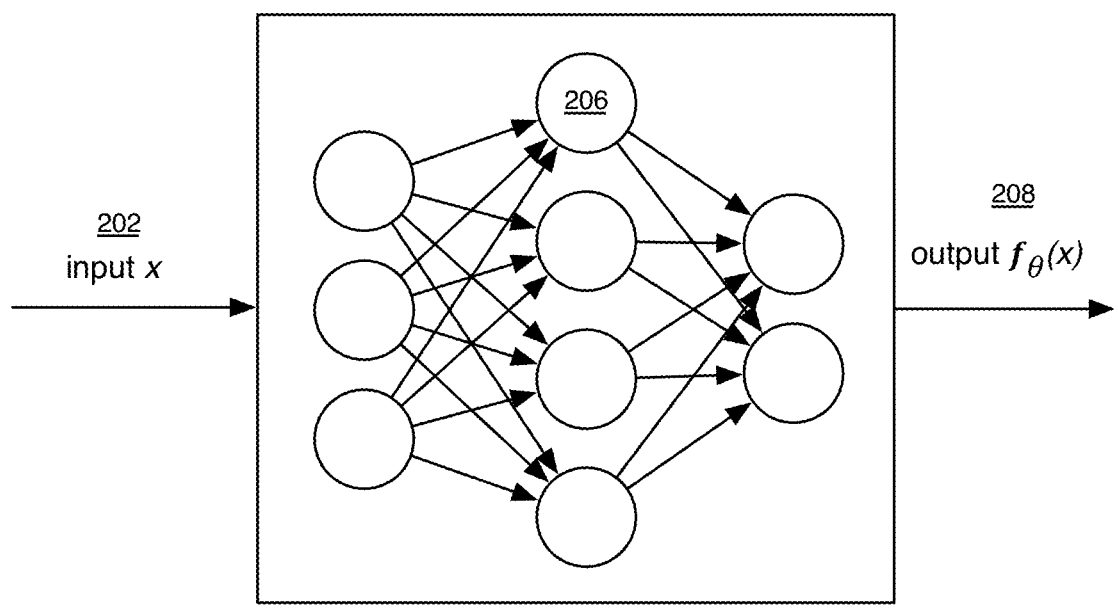
FIG. 2 depicts a diagram concerning loss functions for a neural network, in accordance with some embodiments of the invention.

FIG. 2 depicts a diagram concerning loss functions for a neural network. The diagram includes a neural network 204 comprising connected nodes 206 receiving an input 202 (e.g., image data). The neural network generates an output 208 that is the result of a forward pass through the neural network 204 operating on the input 202. The output 208 may include a vector containing N elements that are predictions regarding whether the input 202 depicted any of N classes that the network 206 was trained to recognize. Such a neural network 206 may be trained to classify input 202 with respect to N classes using a loss function 210. The loss function 210 defines an amount of error representing the effectiveness of the prediction of the network 206 which was based on the current network parameters 212, the parameters 212 comprising weights and biases and where the output 208 includes the prediction, as compared to the true class membership of the input 202 as defined by the labels 216. Based on the error calculated by the loss function 210, the parameters 212 are updated using backpropagation, such that the updated parameters 212 operating on the same input 202 lead to an output 208 that has reduced error.

A typical convolutional neural network may be trained to classify various breeds (types) of dogs. After training, it may be assumed that the network parameters 212 represent certain features that are relevant to the recognition of dogs. In certain embodiments, such a convolutional neural network may be unconventionally modified to additionally emit a string of a certain length that may function as a hash string for identifying individuals within a breed or class. For example, the network may be modified to emit a hash string with four characters (e.g., a string falling in the range of 'AAAA' to 'ZZZZ'). The network will then be trained with a hash-augmented loss function to emit a unique hash string for each unique individual. In the case where the hash string is four characters long, and each character is selected from a set of 26 letters $\{A, B, \ldots Z\}$, then the network may be capable of generating up to $26^4=456,976$ different hash strings to identify 456,976 different individuals. The term "individual" refers to a single member of a class, such as a specific German shepherd dog (e.g., a German shepherd named "Fido"). Or more generally, an "object" is a visually representable type of item, such as a person, weapon, chair, tree, or building. An individual object may be referred to as an "object instance." Instances of an object can be represented in synthetic-domain images (e.g., images generated from a semantic or high-level description of image content using a rendering engine) or in real-domain image data. In certain embodiments, a real-domain image is an image generated by an image sensor based on light information in the environment of the image sensor. In certain embodiments, a real-domain image is a representation of an actual object instance within view of an image sensor and/or the environment within view of an image sensor. The number of unique hashes scales much larger than the conventional classification approach using convolutional neural networks, allowing a robust system (e.g., a system using object instance hash strings) for recognizing object instances in images or video.

In certain embodiments, the hash-augmented loss function may be adapted from a traditional loss function such as loss function 210 shown in FIG. 2 to penalize the miscategorization of each hash string slot (where a slot is the string position for each character of the hash string). The hash-augmented loss function may penalize error where the predicted hash string for an object instance does not remain consistent, and where two different object instances share the same hash string. A hash-augmented loss function may include a term defining (1) an error representing per hash string slot, the distance to the predicted value if this is an object instance that has already been hashed, and (2) a high penalty multiplier on the error if the hash string collides with the hash string predicted for another subject in the training set.

Figure 3:
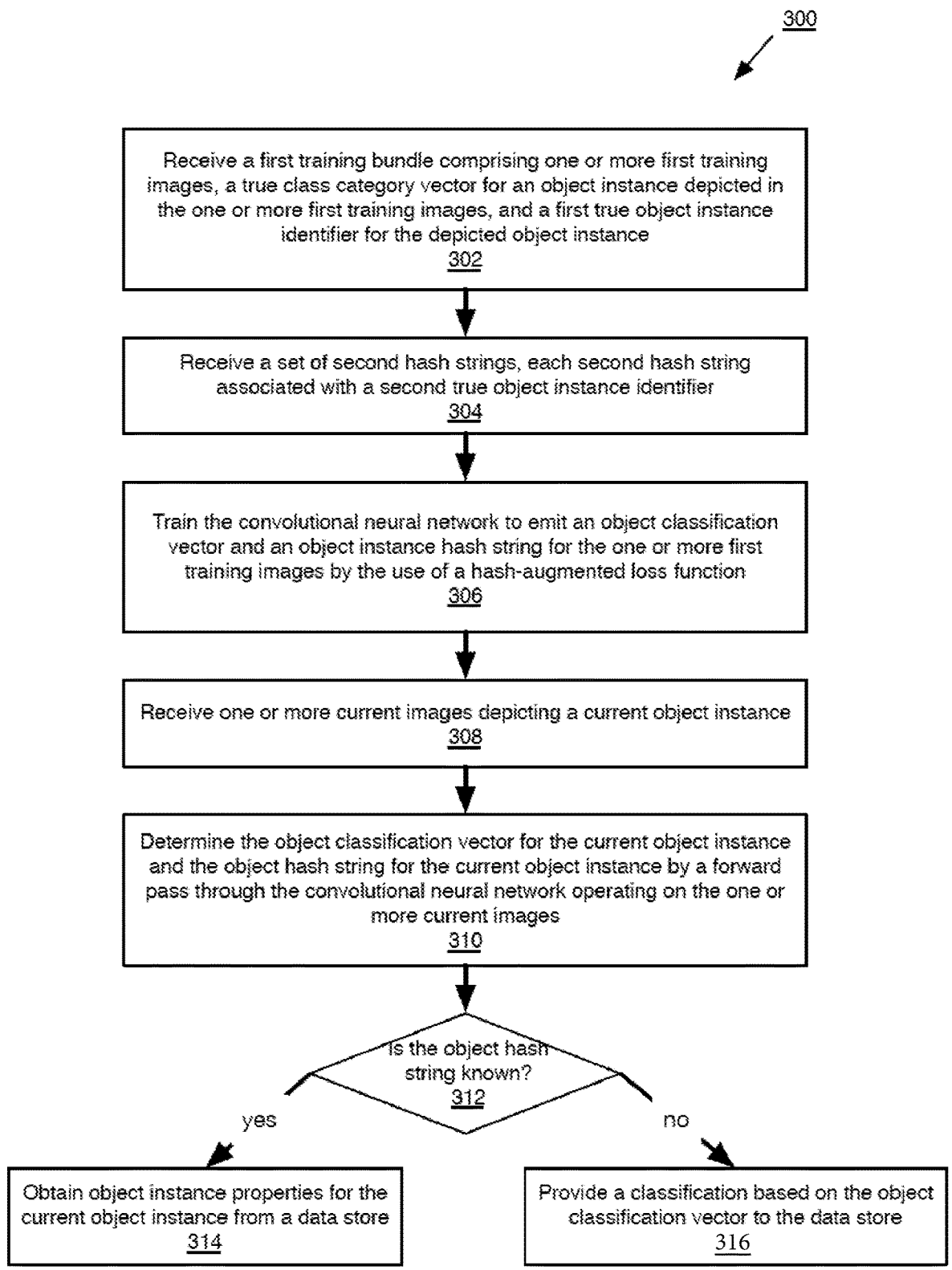
FIG. 3 is a flow chart for an exemplary process concerning a system for inter-camera recognition of individuals and their properties, in accordance with some embodiments of the invention.

FIG. 3 is a flow chart for an exemplary process 300 concerning a system for inter-camera recognition of individuals and their properties by using a convolutional neural network to generate hash strings for identifying object instances. Process 300 includes a step in which the system receives a first training bundle comprising one or more first training images, a true class category vector for an object instance depicted in the one or more first training images, and a first true object instance identifier for the object instance depicted in the one or more first training images (302). The true class category vector may be, for example, a vector or list of object labels 216 (e.g., if the object instance depicted is a German shepherd dog, the vector may indicate a probability of 1 or a Boolean 'true' corresponding to the class category German shepherd dog, and probabilities of 0 corresponding to the non-depicted class categories such as potted plant and rough collie). In certain embodiments, instead of a true class category vector, the process may use another data structure to label the object instance(s) in the training bundle such as a dictionary, e.g., {'category': 'German shepherd dog'}. The first true object instance identifier may be a unique ID for the individual depicted, such as a social security number or a unique integer that has been previously assigned to the object instance. In certain embodiments, the one or more first training images may correspond to the optical characteristics of a camera 100, and each training bundle may include one image per image sensor 102 of the camera 100.

Process 300 includes a step in which the system receives a set of second hash strings, each second hash string associated with a second true object instance identifier, where the set of second hash strings was generated by the convolutional neural network (304). The set of second hash strings may represent hash strings corresponding to object instances that have already been generated based on one or more input images depicting the object instances. For example, the set of second hash strings may be hash strings generated by the convolutional neural network based on a second set of training bundles that does not include the first training bundle.

Process 300 includes a step in which the convolutional neural network of the system is trained to emit an object classification vector and an object instance hash string for the one or more first training images by the use of a hash-augmented loss function, wherein the hash-augmented loss function comprises a classifier loss term and a hash loss term, such that the classifier loss term penalizes the amount of distance between the object classification vector and the true class category vector (or true class category label(s)), and the hash loss term penalizes similarity between the object instance hash string and any of the set of second hash strings where the first true object instance identifier does not match the second true object instance identifier, and the hash loss term further penalizes a distance between the object hash string and any of the set of second hash strings where the first true object instance identifier matches the second true object instance identifier (306).

Once the convolutional network has been trained using training data and the hash-augmented loss function, it may be used to recognize object instances in images. Process 300 includes a step in which a component of the system receives one or more current images depicting a current object instance (308). For example, the one or more current images may be generated by a camera 100 in a monitoring area. Next, a component of the system (e.g., a camera device 100 or a remote server) may determine the object classification vector for the current object instance and the object hash string for the current object instance by a forward pass through the convolutional neural network operating on the one or more current images (310). By this step, the types of object instances depicted in the current images may be determined. Next, if the object hash string is known or recognized (312), the component of the system may obtain object instance properties for the current object instance from a data store using the object hash string (314). In certain embodiments, the data store for compiling object instance properties (such as a name, address, license plate, object instance type, and the like) may be local to or remote from the component. If the object hash string is not known or recognized, the depicted object instance may be a new, unrecognized object instance, and accordingly the new hash string (the object hash string) and any other identified properties such as the object type classification may be provided to the data store (316).

In certain embodiments, the convolutional neural network may be trained to emit multiple hash strings for an object instance. These multiple hash strings may represent different aspects of the object instance, and may be concatenated or collected into a master hash string that can be later decomposed into the various aspect hash strings. For example, certain hash strings may represent static or slow-changing properties (e.g., a human's face, ethnicity, or body structure, or the physical appearance of a vehicle), and other hash strings may represent dynamic properties of an object instance (e.g., events such as a theft, injury, or more frequently changing appearances such as the clothing, gait, or accessories of a human). In certain embodiments, dynamic hash strings representing a given object instance property may be expected to change within a specified interval. For example, a person's clothing may change every day, and a person's gait may change depending on whether the person is running or walking, and if the person is injured. Each hash string representing a certain property may be trained independently. A dynamic hash string may represent a particular property that may be associated with more than one object instance (e.g., hash strings respectively representing bowler hats, gloves, or glasses).

Figure 4:
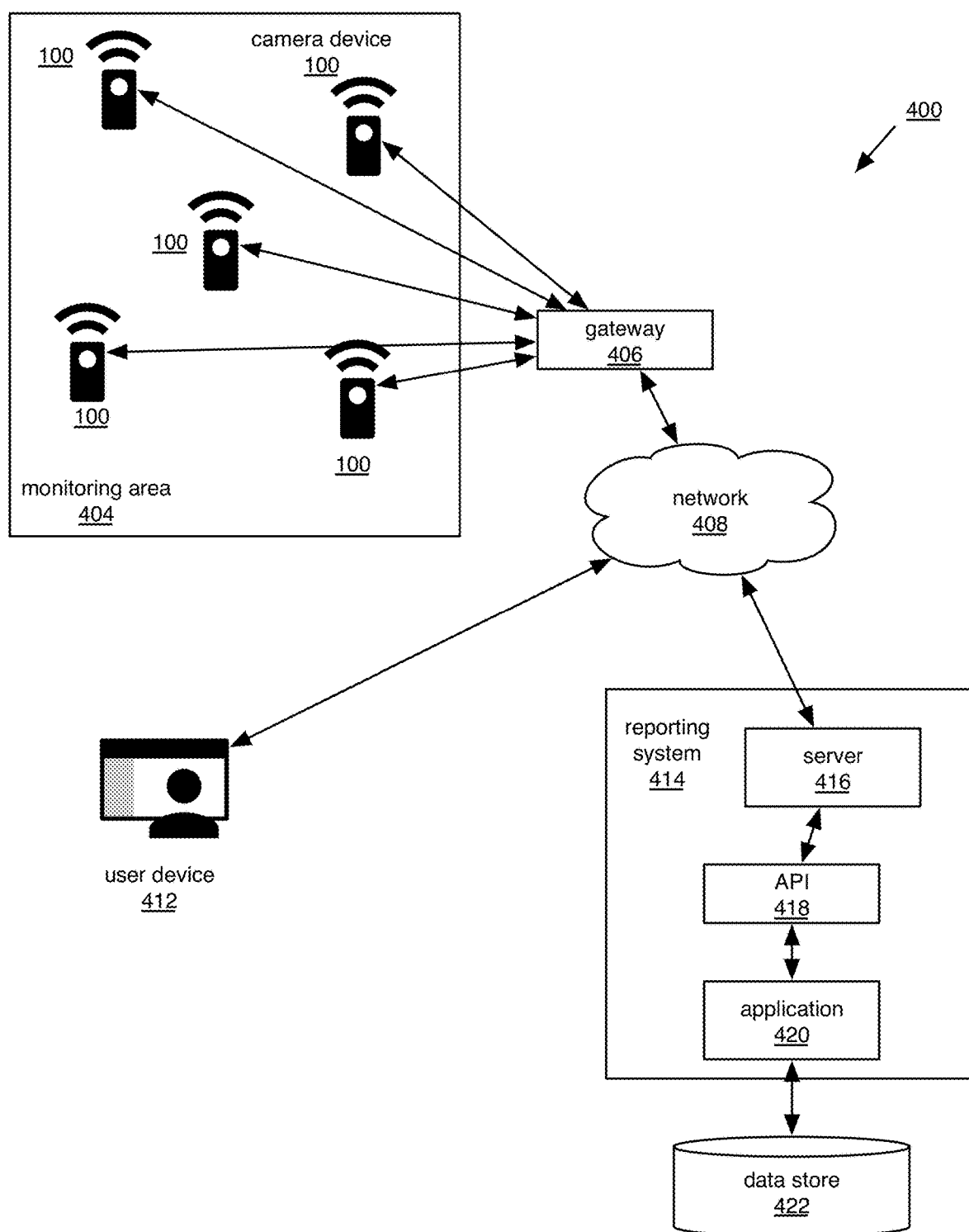
FIG. 4 depicts components of an exemplary distributed system for real-time inter-camera recognition of individuals and their properties, in accordance with some embodiments of the invention.

FIG. 4 depicts exemplary data flows and components of an exemplary distributed system for real-time inter-camera recognition of individuals and their properties 400. In certain embodiments, a collection of camera devices 100 are placed within a monitoring area 404 (e.g., the potential location of targeted content or the environment of camera device 100). Camera devices 100 may provide notifications or the output of inferences (such as updates to a three-dimensional environment model) to gateway device 406 via wired or wireless communication channels, and may receive updates to their local machine-learning models via those channels. Network 408 represents a telecommunications network, a wired or wireless local area network, or the internet. In certain embodiments, camera devices 300 may connect to network 408 without gateway device 406. In certain embodiments, reporting system 414 runs on a cloud service or one or more computing devices hosting a server 416, such as an HTTP server, and an application 420 that may initiate certain actions (e.g., sending reports to client devices) based on events detected or based on inferences at camera devices 100. For example, defined actions and/or user account information may be stored in data store 422. Application 420 may support an Application Programming Interface (API) 418 providing external access to methods for accessing data store 422. In certain embodiments, client applications running on user device 412 or other client devices may access API 418 via server 416 using protocols such as HTTP or FTP, in order to, e.g., view training system user interfaces or reporting system user interfaces and the like.

System 400 may be used to track an object instance across camera devices 100 by generating an object instance hash string by a first camera device 100, and communicating that hash string to a second (or more) camera device 100, e.g., via gateway 406, reporting system 414, or direct wireless data connections between camera devices 100. In one example, if a particular vehicle is being tracked by system 400 as designated by a particular visual signature (e.g., a hash) associated with the vehicle by the system, and the vehicle's license plate is visible in the view of a first camera 100 but occluded in the view of a second camera 100, the second camera 100 may receive the vehicle's object instance hash string from another component of the system that associates the vehicle object instance with the license plate, and may therefore identify the vehicle in view of both cameras (perhaps at different time points) as the same vehicle with the same license plate, even though the license plate is not visible to the second camera.

Figure 5:
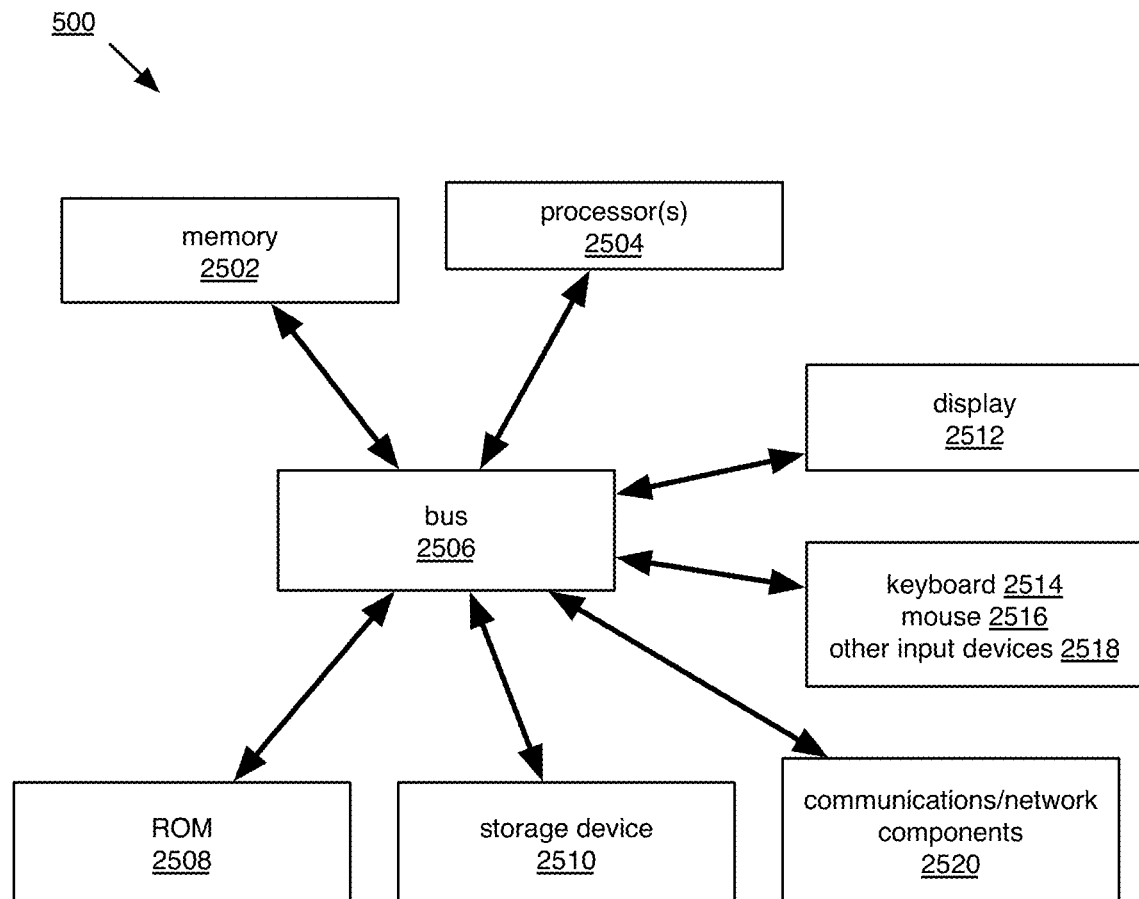
FIG. 5 shows a block diagram of an exemplary computing system, in accordance with some embodiments of the invention.

FIG. 5 is a block diagram showing an exemplary computing system 500 that is representative any of the computer systems or electronic devices discussed herein. Note that not all of the various computer systems have all of the features of system 500. For example, systems may not include a display inasmuch as the display function may be provided by a client computer communicatively coupled to the computer system or a display function may be unnecessary.

System 500 includes a bus 2506 or other communication mechanism for communicating information, and one or more processors 2504 coupled with the bus 2506 for processing information. Computer system 500 also includes a main memory 2502, such as a random-access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 500 may include a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 500 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, Javascript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 500 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method, comprising:
    receiving a first training bundle comprising a first plurality of training images, a true class category vector for a first object instance depicted in the first plurality of training images, and a first true object instance identifier for the first object instance depicted in the first plurality of training images, wherein the true class category vector comprises a vector of elements, in which each vector element is associated with a corresponding class category, and wherein the first plurality of training images includes an image from each image sensor of a camera;
    receiving a set of hash strings, each hash string associated with a second true object instance identifier, where the set of hash strings is generated by a convolutional neural network based on a second set of training bundles that does not include the first training bundle;
    training the convolutional neural network to emit an object classification vector and an object instance hash string for the first plurality of training images by minimizing a hash-augmented loss function, wherein the hash-augmented loss function comprises a classifier loss term and a hash loss term, such that the classifier loss term penalizes a distance between the object classification vector and the true class category vector, and the hash loss term penalizes similarity between the object instance hash string and any of the set of hash strings where the first true object instance identifier does not match the second true object instance identifier, and the hash loss term further penalizes a distance between the object instance hash string and any of the set of hash strings where the first true object instance identifier matches the second true object instance identifier;
    receiving one or more current images depicting a current object instance;
    determining, by the camera, a current object classification vector for the current object instance and a current object instance hash string for the current object instance by a forward pass through the convolutional neural network operating on the one or more current images; and
    if the current object instance hash string is present in a data store, obtaining object instance properties for the current object instance from the data store using the current object instance hash string, and otherwise, providing a classification based on the current object classification vector to the data store.

2. The method of claim 1, wherein one of the vector elements of the true class category vector corresponding to a class category describing the first object instance depicted in the first plurality of training images is set to 1.0 and all other ones of the vector elements of the true class category vector are set to 0.0.

3. The method of claim 1, wherein only one true object instance identifier is assigned to each object instance.

4. The method of claim 1, further comprising training the convolutional neural network to emit one or more object instance dynamic hash strings that identify one or more dynamic object instance properties and events that are depicted in the first plurality of training images.

5. The method of claim 4, wherein the dynamic object instance properties and events include injuries, clothing, or a theft.

6. The method of claim 1, wherein the object instance hash string identifies a static or slow-changing object instance property depicted in the first plurality of training images.

7. The method of claim 6, wherein the object instance static hash string represents a facial appearance of the first object instance when the first object instance is a human, or a physical appearance of the first object instance when the object instance is a vehicle.

* * * * *